US011303573B2

(12) United States Patent
Shlomo (10) Patent No.: US 11,303,573 B2
(45) Date of Patent: *Apr. 12, 2022

(54) METHOD AND SYSTEM FOR MANAGING THE DOWNLOAD OF DATA (71) Applicant: Flash Networks, LTD, Herzliya (IL)

(72) Inventor: Dror Shlomo, Kiryat Tivon (IL)

(73) Assignee: Flash Networks, LTD, Herzliya (IL)

( * ) Notice: Subject to any disclaimer, the term of this patent is extended or adjusted under 35 U.S.C. 154(b) by 190 days.

This patent is subject to a terminal disclaimer.

(21) Appl. No.: 16/726,626

(22) Filed: Dec. 24, 2019

(65) Prior Publication Data

US 2020/0213907 A1 Jul. 2, 2020

Related U.S. Application Data (60) Provisional application No. 62/785,690, filed on Dec. 27, 2018.

(51) Int. Cl.
*H04L 47/2441* (2022.01)
*H04L 47/32* (2022.01)
*H04N 21/44* (2011.01)
*H04L 47/83* (2022.01)
*H04N 21/24* (2011.01)
*H04L 47/30* (2022.01)
*H04W 28/02* (2009.01)
*H04L 47/2475* (2022.01)
*H04L 47/28* (2022.01)
*H04L 47/62* (2022.01)
*H04W 28/10* (2009.01)

(52) U.S. Cl.
CPC .......... *H04L 47/2441* (2013.01); *H04L 47/14* (2013.01); *H04L 47/2475* (2013.01); *H04L 47/28* (2013.01); *H04L 47/30* (2013.01); *H04L 47/32* (2013.01); *H04L 47/621* (2013.01); *H04L 47/823* (2013.01); *H04N 21/2402* (2013.01); *H04N 21/44004* (2013.01); *H04W 28/10* (2013.01)

(58) Field of Classification Search
CPC . H04L 47/2441; H04L 47/14; H04L 47/2475; H04L 47/28; H04L 47/30; H04L 47/32; H04L 47/621; H04L 47/823; H04N 21/2402; H04N 21/44004; H04W 28/10
See application file for complete search history.

(56) References Cited

U.S. PATENT DOCUMENTS

| 2011/0167170 | A1* | 7/2011 | Kovvali | H04W 28/06 709/232 |
| 2015/0215359 | A1* | 7/2015 | Bao | H04L 65/60 709/219 |
| 2018/0176615 | A1* | 6/2018 | Hannu | H04L 69/08 |

* cited by examiner

*Primary Examiner* — Ricky Q Ngo
*Assistant Examiner* — Stephen N Steiner
(74) *Attorney, Agent, or Firm* — Smith Tempel Blaha LLC; Gregory Scott Smith (57) ABSTRACT

A technique is disclosed for delivering packets that carry data from a plurality Internet Protocol (IP) servers toward a plurality of mobile devices (MDs). The disclosed technique postpones or drops data packets that are directed toward a certain MD. The downloaded process can be resumed when the application that is running at the certain MD needs the content that is carried by the postponed data packets. Consequently the delaying process is unnoticeable to the user that uses the application that running over the MD. Thus, the QoE of the user of that MD is not affected.

9 Claims, 5 Drawing Sheets

METHOD AND SYSTEM FOR MANAGING THE DOWNLOAD OF DATA

CROSS-REFERENCE TO RELATED APPLICATIONS

This utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the U.S. provisional application for patent that was filed on Dec. 27, 2018 and assigned the Ser. No. 62/785,690, which application is herein incorporated by reference in its entirety.

FIELD OF THE DISCLOSURE

The present disclosure relates to the field of data communication over a packet switch network such as but not limited to an Internet Protocol (IP) network. More particularly the disclosure relates to communicating IP packets over a cellular network such as but not limited to General Packet Radio Service (GPRS), Universal Mobile Telecommunications System (UMTS), Long-Term Evaluation (LTE) network, etc.

Furthermore the disclosure relates to scheduling the delivering of IP packets over radio links between a base station and a plurality of mobile devices (MD) that are currently associated with that base station (BS).

DESCRIPTION OF BACKGROUND ART

When a plurality of MDs, which are currently associated with a certain BS, require to share the radio resources of that BS, then a scheduler is needed in order to allocate the radio resources between the plurality of MDs.

In order to provide fairness, a common scheduler may use one or more of common scheduling techniques. Techniques such as but not limited to "Frame Level Scheduler" (FLS); Max-Min Fairness; Round Robin; etc. Those techniques are well known to a person with ordinary skill in the art and will not be further disclosed.

Common scheduling techniques take into consideration the quality of the connection with an MD, the status of the channel, the rate that is used by the MD, etc. In addition common scheduler needs to maneuver between maximum throughputs versus fairness. Thus, during congestion conditions the transmitted bitrate of each flow can be reduced. Reducing the transmitted bitrate of certain flows may reduce the quality of experience (QoE) of the user of the MD that obtains this flow. Reducing the transmitted bitrate of a video file may lead the MD to stall or to switch to a lower video resolution affecting the QoE of the user. Thus an improved scheduling algorithm is needed in order to support congestion conditions without reducing the quality of experience (QoE) of the user of an MD.

BRIEF SUMMARY

The needs and the deficiencies that are described above for keeping the QoE of a subscriber are not intended to limit the scope of the inventive concepts of the present disclosure in any manner. The needs are presented for illustration only. Example embodiments of the disclosed technique are configured to add content awareness dimension in scheduling the radio resources. Thus, allowing just-in-time (JIT) policy in scheduling the radio resources. The JIT policy is based on what the application, at an MD, actually needs in order to be unnoticeable to the user. Thus, during congestion the radio resources can be allocated more efficiently taking into consideration the QoE of the user of that MD.

Some examples embodiments of the disclosed technique may use a JIT engine. An example of JIT engine can be configured to identify periods of congestion. Other examples of JIT engine can be configured to obtain an indication about congestion over a certain BS. Yet, other embodiments of JIT engine can be activated independently on the current load over the relevant BS. During operation, an example of JIT engine can be configured to identify the type of content that is carried over a flow of downloaded packets (DL packets) toward a certain MD. Based on the type of content the JIT engine can determine the period of time that the current packet can be stored without affecting the QoE of the user. Along the disclosure and the claims the terms "toward" and "in the direction of" can be used interchangeably.

Some example embodiments of a JIT engine can identify the type of content that is carried over a flow of downloaded packets based on the domain that delivers the relevant flow of packets. Usually packets that are downloaded from "YouTube" carry video data. Other embodiments of the disclosed technique may analyze the pattern of a flow or the network signature of the flow in order to determine the type of content that is carried over that flow of downloaded packets. For example, a flow of video streaming may comprise multiple transactions of medium objects. Yet some embodiments may identify the type of content based on the protocol that is used, etc.

Next, the JIT engine can be configured to store the DL packets. After storing the DL packet and based on the type of content, the JIT engine can determine when to transmit the stored DL packets toward the relevant MD. Transmitting the stored DL packet is done just in time in order to be unnoticeable to the user that uses the application that running over the MD. Thus, the QoE of the user of that MD is not affected.

This type of operation simulate disconnection situation at the application level. However, due to the DL packets that are stored in a read-ahead buffer of the MD, the application can continue playing without affecting the QoE of the user.

In parallel to storing the DL packets of a certain flow, other flows of DL packets can utilize the free radio time-slots. The period of time in which the DL packets of a certain flow are stored can be referred as a silent period of a flow. The period of time, in which the stored DL packets of a certain flow are transmitted toward the relevant MD, can be referred as an active period of a flow.

During the active period, an example embodiment of JIT engine can be configured to transmit the stored DL packets toward the relevant MD in burst mode while ensuring the fairness of the scheduler. Thus, time slot such as but not limited to Physical-Resource-Block (PRB), which is assigned to the relevant MD in each Transmission-Time-Interval (TTI), are not used during the silent period. Those time slots can be allocated to other flows that share the same radio resources. Therefore, during the active period, of the relevant flow, the scheduler can assign time slots of other flows to the relevant flow while keeping the fairness of the scheduler.

In some mobile networks the JIT engine can be installed in an eNodeB as a resources allocation module running on one or more processors of the eNodeB. In other cellular networks the JIT engine can comprise two elements: a JIT-marking-element and a JIT agent. The JIT-marking-element can be installed in an access network operator premises (ANOP). In such example embodiment, the JIT-marking-element can be installed in a gateway or a proxy or in an optimization server that are communicatively coupled between the eNodeB and the Internet. In addition, the JIT agent can be installed on one or more processors of the eNodeB. Along the disclosure and the claims the terms cellular network, mobile network and radio network can be used interchangeably.

The JIT-marking-element that is installed in the ANOP can be configured to identify the type of content carried by a flow of DL packets toward a certain MD, to determine when to deliver the relevant packets. Such an example of JIT engine can be configured to mark those DL packets with JIT indication. The JIT indication can be done by using Differentiated Services Code Point (DSCP) in the Different-Services field (DS field) of the IP header of the DL packets. Other example embodiment of JIT engine can use Network Service Header (NSH) in order to indicate to the scheduler when to transmit those packets.

An example of a JIT agent, at an eNodeB, can be configured to read the JIT indication (JIT flag) that was added to the header of DL packets of a flow to a certain MD and determine whether to transmit the packet toward the relevant MD, or to delay the packet in a queue or to drop the packet. Further, the JIT agent can be configured to remove the JIT flag from the header before sending the packet toward the MD.

Yet, other example embodiments of JIT engine can be installed in the ANOP as JIT optimizer server. The JIT optimizer server can be communicatively coupled between an Internet protocol (IP) network and one or more base stations of the cellular network. The base stations can be eNodeB in LTE network, UTRA in UTMS, or base transceiver station (BTS) in GSM networks. LTE stands for Long-Term Evolution; UTMS stands for Universal Mobile Telecommunications System; UTRA stands for UMTS Terrestrial Radio Access. The functionality of those cellular network devices are well known to a person with ordinary skill in the art and will not be further discussed.

An example of JIT-optimizer-server can be configured to implement the JIT policy of the cellular operator. An example of JIT-optimizer-server can be configured to identify the type of content that is carried over each flow from a plurality of flows of DL packets (downloaded packets) transmitted toward a plurality of MDs; to store the DL packets of each flow in a separate queue. Then, based on the type of content of each flow the JIT-optimizer-server can determine when to transmit the stored DL packets of each flow toward the relevant MD. Finally, the JIT-optimizer-server may transmit the stored DL packet just in time when the application that running over that MD needs them. Thus, the JIT-optimizer-server may combine the functionality of the JIT-marking element and the JIT-agent. Along the present disclosure and the claims the term JIT-optimizer-server and the term JIT engine can be used interchangeably.

Referring now to describing examples of different type of applications and how an example of JIT engine can handle each one of them. A common video player, such as but not limited to "YouTube" or "Facebook player", is configured to fill buffer that can support up to few minutes of read-ahead period. Common value of read-ahead period can be in the range of 0.5 to 10 minutes, 2 minutes for example. Then, the player may keep the buffer full or increase resolution if possible.

Further, a common video player allows "seek operation". By using the seek option a user can jump forward or backward from one place to another along the video file. YouTube LLC is a US video sharing domain. Currently YouTube operates as one of Google's subsidiaries. Facebook Inc. is a US social media domain. Facebook and YouTube are well known to a person with ordinary skill in the art and therefore they will not be further disclosed.

In order to handle downloading of a video file an example of JIT engine can be configured to estimate the size of a read-ahead accumulated buffer at the MD. Estimating the size of the read-ahead buffer can be done by counting the amount of bits that were transmitted toward the MD. This parameter can be marked as transmitted number of bits (TNB). Then, the video bitrate (VBR) that is used by the MD can be assumed. Next the transmitted-video-time (TVT) in seconds can be estimated as TVT≃TNB:VBR (TNB divided by VBR). Finally the read-ahead buffer size in seconds can be estimated as the value of TVT minus the elapsed time from which the counting of the amount of the transmitted bits was started.

Upon determining that the read-ahead buffer contains data to be played during a period above a certain value, then the JIT engine may set the JIT flag. The certain value of time can be referred as the Stop-Threshold Period (STP). A common STP can be in the range between few tens to few hundreds of seconds, 120 seconds for example. Responding to the JIT flag can be implemented in different ways depending on the location in which the example of JIT engine is located. Independently of the process that can be implemented, the result of setting the JIT flag is a break in transmitting DL packets toward the MD.

In parallel to holding the transition, the JIT engine can be configured to continue monitoring the state of the read-ahead buffer at that MD. Upon determining that the buffer size contains data that is sufficient to be played during a period that is a portion of the STP (PSTP). The value of the portion can be in the range of 0.1 to 0.9 a common portion can be 0.5, for example. Thus, for STP of 120 seconds the value of PSTP can be 60 seconds. Upon determining that the volume of data stored in the read-ahead buffer at the relevant MD is sufficient to play for PSTP (60 seconds for example), then the JIT engine may reset the JIT flag resuming the downloading process toward the relevant MD. The resumed downloading process can be implemented in burst mode. In the present disclosure and the claims the term "just-in-time (JIT)" represents a period of time prior to the time in which the application, in the MD, needs the downloaded process to be resumed. The period of time can be in the range of few tens of seconds, to few minutes. A common value can be 60 seconds, for example.

Upon determining that a seek operation has been executed by a user of a certain MD, an example of JIT engine can be configured to drop all the accumulated data in the Queue and start the above disclosed process assuming that the read-ahead buffer, at the relevant MD, is empty.

During congestion, an example of JIT engine can handle background traffic by setting the JIT flag for the packets of the background traffic, thus holding the transition of the background traffic. Background traffic can be identified based on the protocol that is used. Other background traffic can be identified based on the source domain, etc. In parallel, the JIT engine can control the Receiving-window TCP flag toward the internet server in order to reduce the bit-rate that is used by the Internet server for downloading the background traffic of data packets.

Some examples embodiments of the disclosed technique may manage the upload traffic from the MDs toward the IP servers. An example of such embodiment of a JIT engine can be a processor that is configured to identify the type of content that is carried over a first flow of uploading packets from a first MD from the plurality of associated MDs. Upon determining the type of the uploaded content, an example of JIT engine can determine whether the upload packets can be postponed. Next, based on the current congestion at the relevant BS and the type of content, an example of JIT engine may delay the request for the next packet from the MD. Thus, allowing the scheduler at the BS to allocated radio resources to other MDs.

Some examples embodiments of the disclosed technique may manage the uplink traffic of requests from the MDs toward the content servers. An example of such embodiment can be a processor that is configured to identify the type of content that is carried over a first flow of downloaded packets toward a first MD from the plurality of associated MDs. Next, an example of the JIT engine can estimate when the content, which will be carried over a response to a current request that is sent from the MD toward a relevant content server will be needed by an application that handles the first flow of downloaded packets at the first MD. Based on this estimation the request for a packet from the relevant content server, which was sent from the MD toward the relevant server, can be delayed or dropped. In the following description and the claims, the term "uplink" and "upload" may be used interchangeably. In the following description and the claims, the verbs "delay", "postpone" or "drop" can be used interchangeably.

Yet, other example embodiment of the disclosed technique may use a JIT-marking element and a JIT agent. Both units may use synchronized clocks thus the two clocks present the same time. In such embodiment the JIT-marking element is configured to add a JIT indication to each packet of a flow. The JIT indication can point on the time (the reading of the clock) in which the content that is carried by that packet will be needed by the application that is running in the MD and handles that flow of packets.

The JIT agent can be configured to scan the queue of each of the flows that are associated with a certain BS and divide the stored packets into two or more groups. The groups are divided according to the time difference between the current reading of the clock that is associated with the JIT agent and the value of the clock that is stored in the JIT indication (the one that was written by the JIT-marking element).

In some example embodiments of the disclosed technique four groups can be used. The first group can comprise packets in which the time difference (time interval) is less than five seconds, The second group can comprise packets in which time difference is between five seconds to ten seconds, The third group can comprise packets in which time difference is between ten seconds to fifteen seconds and the last group can comprise packets in which time difference is above fifteen seconds. Other example embodiments of the disclosed technique may other number of groups and/or other values of boundaries between groups.

Then, the JIT agent can fetch the first group of packets, remove the JIT indication and transfer them toward the relevant MD. If there are additional radio resources, then the JIT agent can fetch the next group of packets, removes the JIT indication and send them toward the relevant MD. If, there are no additional resources, then the JIT agent can be configured to return to scanning the queue of each of the flows that are associated with a certain BS and divide the stored packets into two or more new groups and so on.

Yet, other embodiment of the disclosed technique may be configured to sort the packets based on the time when they are needed by the application running at the relevant MD, to remove the JIT indication, and to send the packets in ascending order.

In other example embodiments of the disclosed technique the JIT agent can be configured to read the JIT indication that was added by the JIT-marking element and accordingly may block requests that are sent from the MD. Upon determining that the time difference between the current reading of the clock that is associated with the JIT agent and the value of the clock that is stored in the JIT indication is smaller than a certain threshold, the JIT agent may transfer the request from the MD toward its destination, The threshold can be in the range of few seconds, 10 to 60 seconds for example. A common value can be 30 seconds, for example.

Some example embodiments of the disclosed technique may be configured to handle encrypted downloaded packets that carry video data from content providers. A content provider such as but not limited to YouTube LLC or Facebook Inc. Some of those example embodiments may determine that the encrypted downloaded packets carry video data based on the content server that delivers those packets. For example, if the encrypted packets are delivered from YouTube domain, then the encrypted content can be handled as video data.

Other example embodiment of the disclosed technique may analyze the signature of the flow of data packets. A flow that comprises multiple transactions of medium size object can be marked as a flow that carries encrypted video data. Other example embodiments of the disclosed technique may determine that the encrypted flow of data comprise video data based on the protocol that is used for downloading the encrypted video data. Other example embodiments may combine the source of the data flow and the signature of the flow in order to determine that the flow carries encrypted video data. Yet other embodiments may use other methods for determining that the encrypted data packets carry video data.

Some example embodiments of the disclosed technique may use a read-ahead-buffer table (RABT) per each type video player or video encoding. An example of an RABT may have three columns and a plurality of lines. The first column can be associated with the resolution in which the video is presented, each line indicates the presented resolution (1080, 720, 480 pixels, etc.). The second column can be associated with the volume of bytes that are stored in the read-ahead-buffer of the player and the $3^{rd}$ column can be associated with the play time of the stored data in the read-ahead-buffer. Examples of RABT exist over the Internet in association to the type of video player.

In order to use such a RABT an example embodiment of the disclosed technique can be configured to predict the resolution that is currently used by the player. The predicted resolution can be placed in the RABT in order to estimate the play time of the video data that is stored in the read-ahead buffer of the MD.

Per each type of video player and per each possible resolution a predicting model can be generated. Using the current RTT (round trip time), the current download bitrate, and the elapsed time as the values of the variables to be placed in the predicting model of each possible resolution of a certain video player. Then, the probability that the relevant resolution is used can be calculated. The process can be repeated and be executed per each possible resolution. Then the values of the probabilities of each possible resolution can be compared and the resolution that is associated with the highest value of probability can be pointed as the current used resolution. This resolution can be placed in the RABT in order to retrieve the play time of the video data that is stored in the read-ahead buffer of the player in the MD.

Next, an embodiment of the disclosed technique may hold the downloaded process for a portion of the play time of the read-ahead buffer. The downloading process can be resumed upon determining that play time is going to be terminated. Thus, the downloading process can be resumed JIT before terminating the play time. The JIT can be few seconds before terminating the read-head buffer. In some embodiments the JIT can be in the range between two to 20 seconds, ten seconds for example before terminating the play time of the read-ahead buffer of the relevant video player.

In order to create a predicting model per each video player we run a plurality of experiments in which we use different values of RTT, bitrate, elapsed time, etc. and check the resolution that is used by the player. Based on those experiments we created a database and we execute machine learning algorithm that analyzes the stored data of the experiments and deliver an appropriate predicting model to predict the probability that the relevant resolution is used by the player. The machine learning algorithm can be based on algorithm such as but not limited to logistic regression, linear regression, decision tree, random-forest, etc.

Some example embodiments of the disclosed technique can be configured to identify that a seek operation has been requested by a user of a certain MD, an example of JIT engine can be configured to drop all the accumulated data in the Queue and start the above disclosed process assuming that the read-ahead buffer, at the relevant MD, is empty. An example embodiment of JIT engine, which mange the download traffic toward an MD, may learn the current pattern of the download process and upon determining that the download pattern has been changed, the size of the payload of the DL packets was suddenly increased compare to previous payloads. In some cases the increase in the size of the payload can be for a collection of packets over a certain period of time.

Another example embodiment of JIT engine that manages the uplink traffic can be configured to learn how a certain player may respond to blocking its request at the JIT engine. Consequently the player at the relevant MD, which wait to get a response to it's blocked request, may retransmit it's request again and again. An example embodiment of JIT engine may analyze the pattern in which each player retransmits requests. An example player may retransmit a request for additional video data at a fix period of time. Such an example of JIT engine upon getting a request that does not match the learned pattern of retransition requests, the example JIT engine may conclude that this request is a seek request.

Upon determining that the request is a seek request, the seek request is transferred toward the relevant server without any further delay. In addition such an example of JIT engine can be configured to drop all the accumulated data in the Queue of that MD and start the above disclosed process assuming that the read-ahead buffer, at the relevant MD, is empty.

The foregoing summary is not intended to summarize each potential embodiment or every aspect of the present invention, and other features and advantages of the present invention will become apparent upon reading the following detailed description of example embodiments with the accompanying drawings and appended claims.

Furthermore, although specific example of embodiments are described in detail to illustrate the inventive concepts to a person with ordinary skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the disclosed embodiments with the accompanying drawings and appended claims.

BRIEF DESCRIPTION OF THE DRAWING

Exemplary embodiments of the present disclosure will be understood and appreciated more fully from the following detailed description, taken in conjunction with the drawings in which.

DETAILED DESCRIPTION

The invention can be implemented in numerous ways, including a process; an apparatus; a system; a computer program product embodied on a computer readable non-transitory storage medium; and/or a processor, such as a processor configured to execute instructions stored on and/or provided by a non-transitory memory device coupled to the processor.

In this specification, these implementations, or any other form that the invention may take, may be referred to as techniques. In general, the order of the steps of disclosed processes may be altered within the scope of the invention. Unless stated otherwise, a component such as a processor or a non-transitory memory device described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable non-transitory storage device such as a read/write hard disc, CDROM, Flash memory, ROM, or other memory or storage devices, etc. In order to execute a certain task a software program may be loaded to an appropriate processor as needed. In the present disclosure the terms task, method, process can be used interchangeably. In the present disclosure the verbs transmit, transfer or be placed in a queue can be used interchangeably. Packets that are placed in a queue are sent as soon as possible.

Figure 1:
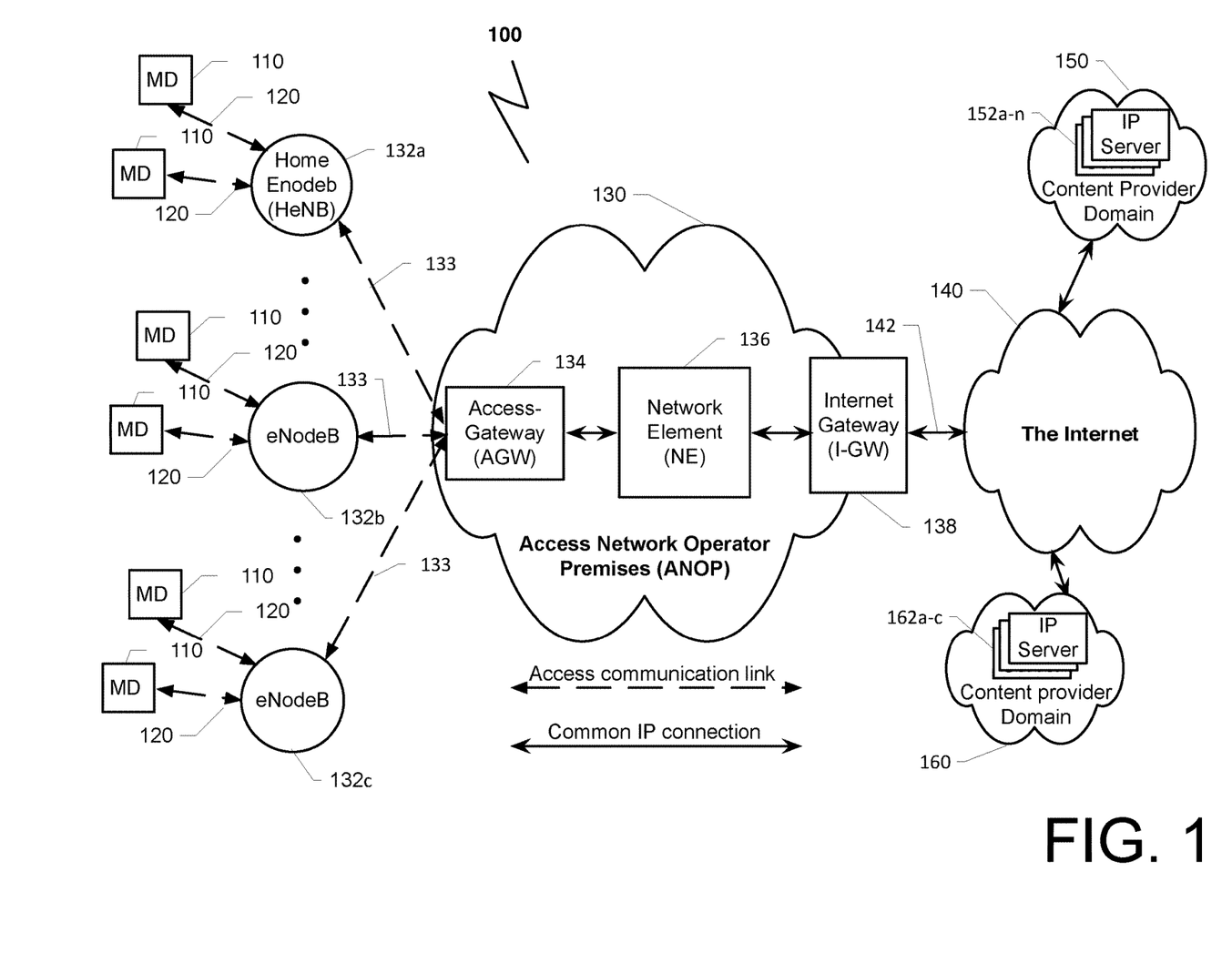
FIG. 1 illustrates a block diagram with relevant elements of an example of a mobile communication system in which an embodiment of the present disclosure can be implemented for handling JIT scheduling.

FIG. 1 depicts a block diagram with relevant elements of an example of a communication system 100 in which an example embodiment of the present disclosure can be implemented. Communication system 100 can be configured to handle data-packet traffic over TCP/IP or UDP/IP network, for example. Communication system 100 can comprise an Access Network Operator Premises (ANOP) 130, a plurality of mobile-devices (MDs) 110, a plurality of intermediate nodes 132a-c, the Internet 140, one or more domains 150 and 160, each domain has one or more IP servers 152a-c and 162a-c respectively. Domains 150 and 160 can be associated with content providers such as but not limited to YouTube LLC of Facebook Inc. The intermediate nodes 132a-c can comprise: Home eNodeB (HeNB) 132a; eNodeB 132b&c, for example.

The ANOP 130 can be connected to the Internet 140 via an I-GW 138 and a communication link 142. An example of I-GW 138 can be configured to communicate with a NAT in order to get a public IP address for a new flow. The NAT can be a Carrier-Grade NAT (CGN). The CGN can reside in the ANOP 130. An example of ANOP 130 can be the access network of a GPRS cellular operator, LTE cellular operator, etc.

A few non-limiting examples of typical mobile-devices (MDs) 110 can be: a laptop, a mobile phone, a PDA (personal digital assistance), a smart phone, a tablet computer, etc. A smartphone is a mobile phone with an advanced mobile operating system that combines features of a personal computer operating system with other features useful for mobile or handheld use. Each MD 110 may employ a video player such as but not limited to "YouTube player" or "Facebook player".

An MD 110 can be connected to an access gateway (AGW) 134 via intermediate nodes such as eNodeB 132b&c or Home eNodeB (HeNB) 132a and a backhaul network 133. A non-limiting example of an AGW 134 can be an S-GW or P-GW. Along the disclosure and the claims the term AGW and S-GW can be used interchangeably. The connection between an MD 110 and the intermediate nodes 132a-c can be implemented by cellular links 120.

An ANOP 130 can provide different services to the plurality of MDs 110. Few non-limiting examples of services provided by the ANOP 130 can comprise: delivering access to the Internet, spam filtering, content filtering, bandwidth consumption, distribution, transcoding, rating adaptation, power saving, etc. Among other elements, an example ANOP 130, which is configured to implement an example embodiment of the disclosed technique, may comprise an example embodiment of a Network Element (NE) 136. An example of NE 136 can be a TCP and/or UDP proxy located between one or more of the MDs 110 via AGW 134 and one or more IP servers via I-GW 138. An example of NE 136 can be configured to deliver content awareness scheduling. In order to deliver content awareness scheduling some example embodiments of NE 136 may manipulate the download traffic. Other example embodiments of NE 136 manipulate the uplink traffic.

Among other tasks, an example of AGW 134 can be configured to identify a requesting MD 110 at its ingress to the ANOP 130, to process the data traffic to or from the plurality of MDs 110 via the one or more intermediate nodes 132a-c. In the direction from the MD 110 toward the internet 140, the AGW 134 can be configured to transfer the IP traffic toward the NE 136. An example AGW 134 can be an S-GW for an LTE network, another example of AGW can be P-GW. The AGW 134 can be configured to identify the subscriber and accordingly can determine whether the subscriber is allowed to get the required access to the network and what services the subscriber is entitled to receive, etc. In some embodiments of system 100, the AGW 134 can be configured to handle the mobility management of MDs 110 and implement a signaling channel over the backhaul network 133 for paging and mapping each MD 110 to its currently associated eNodeB or HeNB 132a-c.

The I-GW 138, at the other side of ANOP 130, may participate in a process of allocating one or more public IP addresses to the requesting MD 110 to be used during the current transaction. In some embodiments I-GW 138 may act also as a router, for example. The I-GW 138 can route IP data packets to and from the plurality of IP servers 152a-c and 162a-c via the Internet 140. The communication between the I-GW 138 and the Internet 140 can be based on Internet protocol (IP). A person with ordinary skill in the art is familiar with the functionality of S-GW, P-GW and I-GW; therefore it will not be further disclosed.

Among other tasks, an example embodiment of NE 136 can be configured to add content awareness dimension in scheduling the radio resources. Thus, allowing just-in-time (JIT) policy in scheduling the radio resources. The JIT policy is based on when the application, at an MD 110, actually needs certain content in order to be unnoticeable to a user of the MD 110. Thus, the radio resources can be allocated more efficiently taking into consideration the QoE of the user of that MD 110.

In some embodiments of the disclosed technique NE 136 can comprise a JIT marking engine that is associated with a JIT agent. The JIT agent can be installed in an eNodeB. In such embodiment, the NE 136 can be configured to identify the type of content that is carried over a flow of downloaded packets from IP servers 152*a-c* or 162*a-c* and add a JIT indication (flag) to each packet of the flow. The JIT flag can indicate a period of time prior to the time when the carried content of that packet will be needed by the application that is executed at the relevant MD 110. Along the present disclosure and claims the terms "JIT marking engine" and "JIT marking element" can be used interchangeably.

In other example embodiments of the disclosed technique the NE 136 can be configured to act as a JIT-optimizer server that can be configured to implement the JIT policy of the cellular operator. An example of JIT optimizer server can be configured to identify the type of content that is carried over each flow from a plurality of flows of DL packets transmitted from the IP servers 152*a-c* or 162*a-c* toward the plurality of MDs 110; to store the DL packets of each flow in a separate queue.

Based on the type of content of each flow the NE 136 can determine when to transmit the stored DL packets of each flow toward the relevant MD 110 and to transmit the stored DL packet just in time when the application that running over that MD 110 needs them. Thus, such an example of NE 136 simulates disconnection situation at the application level. However, due to the DL packets that are stored in a read-ahead buffer of the MD 110, the application at the MD 110 continues playing without affecting the QoE of the user.

Some examples embodiments of NE 136 may manage also the upload traffic from MDs 110 toward the IP servers 152*a-c* or 162*a-c*. An example of NE 136 can be a processor that is configured to identify the type of content that is carried over a first flow of uploading packets from a first MD 110 from the plurality of associated MDs. Upon determining the type of the uploaded content, an example of NE 136 can determine whether the upload packets can be postponed. Next, based on the current congestion at the relevant BS 132*a-c* and the type of content, an example of NE 136 may delay the request for the next packet from the MD. Thus, allowing the scheduler at the BS 132*a-c* to allocated radio resources to other MDs 110.

Yet, other example embodiments of NE 136 may be configured to manage the uplink traffic of requests from the MDs 110 toward the content servers 152*a-c* or 162*a-c*. An example of such NE 136 can be configured to identify the type of content that is carried over a first flow of downloaded packets toward a first MD 110 from the plurality of associated MDs 110. Next, the example of the NE 136 can estimate when the content, which will be carried over a response to a current request that is sent from the MD 110 toward a relevant content server 152*a-c* or 162*a-c* will be needed by an application that handles the first flow of downloaded packets at the first MD 110. Based on this estimation the request for the next packet that was sent from the MD 110 toward the relevant server 152*a-c* or 162*a-c* can be postponed or dropped.

Figure 2A:
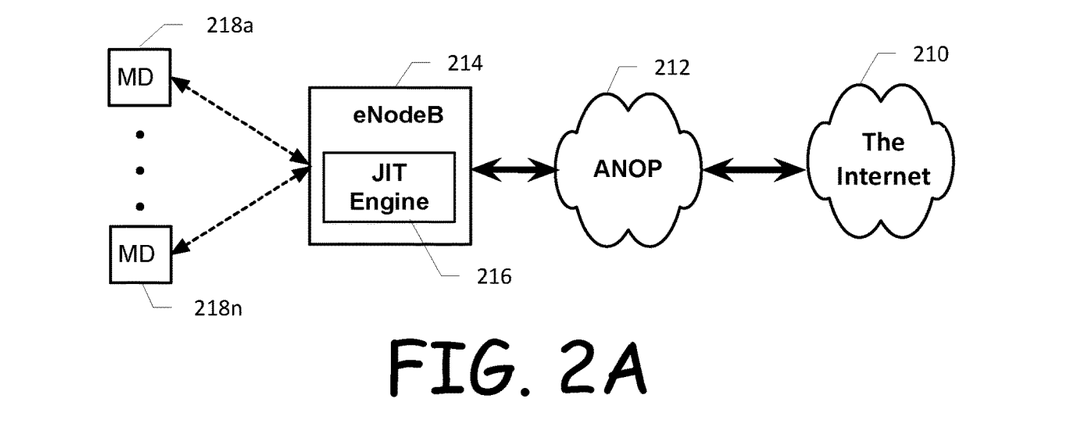
FIG. 2A illustrates a block diagram with relevant elements of a network architecture in which an example of JIT engine is associated with an eNodeB.
Figure 2B:
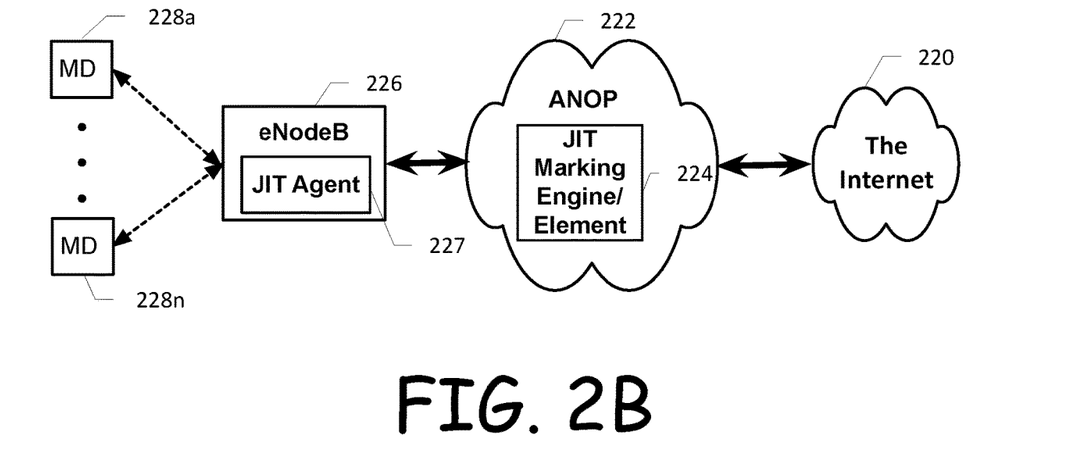
FIG. 2B illustrates a block diagram with relevant elements of a network architecture in which an example of JIT-marking element is associated with an ANOP and a JIT agent is associated with an eNodeB.
Figure 2C:
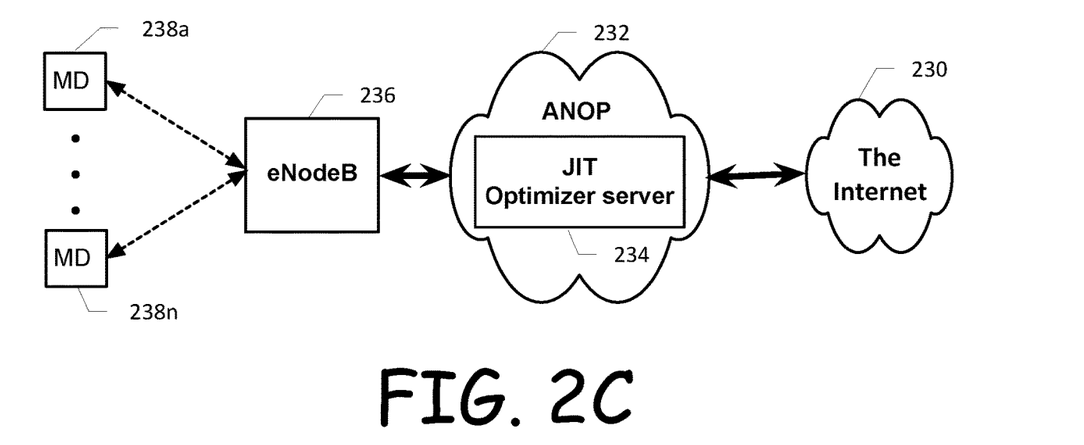
FIG. 2C illustrates a block diagram with relevant elements of a network architecture in which an example of JIT Optimizer server is associated with an ANOP.

FIGS. 2A to 2C illustrate block diagrams with relevant elements of three examples of network architecture in which different example embodiment of the disclosed technique can be implemented. FIG. 2A illustrates a block diagram of a network architecture in which an example of JIT engine 216 can be associated with an eNodeB 214. Such architecture may comprise the Internet 210 that is communicatively coupled to eNodeB 214 via the ANOP 212.

A flow of DL packets that carries media content can travel from a content server (not show in the figure) that resides over the Internet cloud 210 via the cellular ANOP 212 to the eNodeB 214 and from the eNodeB the packets can be transmitted toward the relevant MD 218*a-n*. In eNodeB 214 the DL packets can be transferred via the JIT engine 216 toward a scheduler (not shown in the figure) of the eNodeB 214, which determines when to transmit the packet toward the relevant MD 218*a-n*.

Some examples of JIT engine 216 can be configured to identify periods of congestion at eNodeB 214. Other examples of JIT engine 216 can be configured to obtain an indication about congestion over eNodeB 214. Yet, other embodiments of JIT engine 216 can be activated independently on the current load over eNodeB 214. During operation, an example of JIT engine 216 can be configured to identify the type of content that is carried over a flow of downloaded packets (DL packets) toward a certain MD 218*a-n*. Based on the type of content the JIT engine 216 can determine the period of time that the current packet can be stored (postponed) without affecting the QoE of the user of that MD 218*a-n*.

Next, the JIT engine 216 can be configured to store the packets of that flow. Based on the type of content, the JIT engine 216 can determine when to transfer the stored DL packets toward the scheduler of the eNodeB 214 in order to be transmitted toward the relevant MD 218*a-n* when the application that running over the MD 218*a-n* needs them. Thus, the QoE of the user of that MD is not affected.

Some examples of JIT engine 216 can be configured to manage the uplink traffic of requests from the MDs 218*a-n* toward the content servers (not show in the figure) that resides over the Internet cloud 210. Next, an example of the JIT engine 216 can estimate when the content, which will be carried over a response to a current request that is sent from the MD 218*a-n* toward a relevant content server will be needed by an application that handles the first flow of downloaded packets at the first MD 218*a-n*. Based on this estimation the request for the next packet, which was sent from the first MD 218*a-n* toward the relevant server, can be delayed.

FIG. 2B illustrates a block diagram of a network architecture in which an example of JIT engine comprises two elements. The first element, "JIT marking engine" or "JIT marking element" 224 is associated with the ANOP 222. The second element, JIT agent 227, can be associated with an eNodeB such as but not limited to eNodeB 226. The JIT-marking-engine 224 can be installed in a gateway or a proxy or in an optimization server (not shown) that resides at the ANOP 222 and is communicatively coupled between the eNodeB 226 and the Internet 220. Along the present disclosure and claims the terms "JIT marking engine" and "JIT marking element" can be used interchangeably.

The JIT-marking-engine 224 can be configured to identify the type of content carried by a flow of DL packets toward a certain MD 228*a-n* and to determine when to deliver the relevant packets. Such an example of JIT-marking-engine 224 can be configured to mark those DL packets with JIT indication. In some embodiments the JIT indication can be implemented by using Differentiated Services Code Point (DSCP) in the Different-Services field (DS field) of the IP header of the DL packets. Other example embodiments of JIT-marking-engine 224 can use Network Service Header (NSH) in order to indicate to the JIT agent 227 when to transfer the packet toward the scheduler of eNodeB 226 in order to transmit those packets. More information on the operation of an example of a JIT-marking-engine 224 is disclosed below in conjunction with FIG. 4.

An example of JIT agent 227, which is associated with the eNodeB 226 can be configured to read the JIT indication (JIT flag), which was added by the JIT marking engine 224 to the header of each of the DL packets of the flow of packets toward the relevant MD 228*a-n*. Based on the JIT indication the JIT agent 227 can determine whether to transmit a current DL packet toward the relevant MD 228*a-n* via the scheduler (not shown) of the eNodeB 226, or to delay the packet in a queue or to drop the packet. Further, the JIT agent 227 can be configured to remove the JIT flag from the header before sending the packet toward the relevant MD 228*a-n*. More information on the operation of an example of JIT agent 227 is disclosed below in conjunction with FIG. 5.

Some example embodiments of JIT-marking engine 224 and JIT agent 227 may use synchronized clocks. In such embodiment the JIT-marking element 224 is configured to add a JIT indication to each packet of a flow. The JIT indication can point on the time (the reading of the clock) in which the content that is carried by that packet will be needed by the application that is running in the MD 228*a-n* and handles that flow of packets. The JIT agent 227 can be configured to read the JIT indication that was added by the JIT-marking engine 224 and accordingly may block requests that are sent from the MD 228*a-c*. Upon determining that the time difference between the current reading of the clock that is associated with the JIT agent 227 and the value of the clock that is stored in the JIT indication is smaller than a certain threshold, then the JIT agent 227 may transfer the request from the MD toward the relevant server, The threshold can be in the range of few seconds, 10 to 60 seconds for example. A common value can be 30 seconds, for example.

FIG. 2C illustrates a block diagram of another network architecture in which a JIT optimizer server 234 is disclosed. The JIT optimizer server 234 can be one of the servers that are installed in ANOP 232. The JIT-optimizer server 234 can be configured to identify the type of content that is carried over each flow from a plurality of flows of DL packets transmitted from the IP servers (not shown) that resides at the Internet 230 toward the plurality of MDs 238*a-n*.

Next the JIT optimizer server 234 can store the DL packets of each flow in a separate queue. Based on the type of content of each flow the JIT optimizer server 234 can determine when to transmit the stored DL packets of each flow toward the relevant MD 238*a-n*. On the appropriate time, the JIT optimizer server 234 can transmit the stored DL packet toward the relevant MD 238*a-n* via eNodeB 236 JIT when the application that running at that MD 238*a-n* needs that the flow of DL packet will be resume. Thus, such an example of JIT optimizer server 234 simulates disconnection situation at the application level. However, due to the DL packets that are stored in a read-ahead buffer of the MD 238*a-n*, the application at the MD continues playing without affecting the QoE of the user. More information on the operation of an example of JIT optimizer server 234 is disclosed below in conjunction with FIG. 3.

Some example embodiments of JIT-optimizer server 234 can be configured to manage the uplink traffic of requests from the MDs 238*a-n* toward the content servers (not shown) that reside over the Internet 230. An example of such embodiment of JIT optimizer server 234 can be a processor that is configured to identify the type of content that is carried over a first flow of DL packets toward a first MD from the plurality of associated MDs 238*a-n*. Next, an example of the JIT optimizer server 234 can estimate when the content, which will be carried over a response to a current request that is sent from the MD 238 toward the relevant content server over the Internet 230 will be needed by an application that handles the first flow of downloaded packets at the first MD 238. Based on this estimation the request for the next packet that was sent from the MD 238 toward the relevant server can be delayed or dropped.

Figure 3:
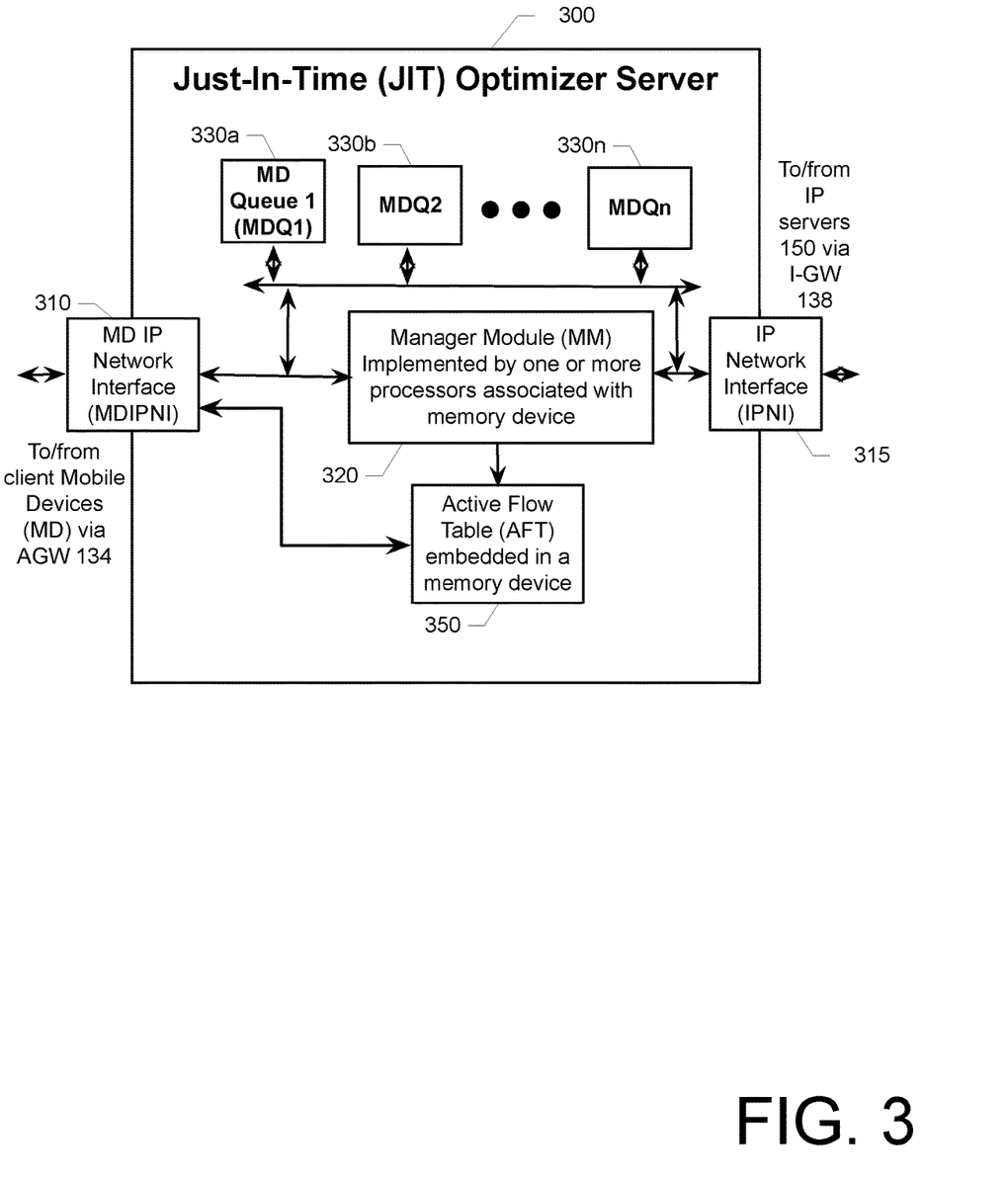
FIG. 3 illustrates a block diagram with relevant elements of an example of JIT optimizer server.

FIG. 3 depicts a block diagram with relevant elements of an example embodiment of a JIT optimizer server 300. For readability and instructional purposes the disclosed embodiment is divided into few logical modules. Further, an example of JIT optimizer server 300 may comprise one or more processors, computer readable non-transitory memory device such as a read/write hard disc, CDROM, Flash memory, ROM, or other non-transitory memory or storage devices, etc. Software of a logical module may be embodied on one of the computer readable non-transitory storage medium. In order to execute a certain task, a software program may be loaded to an appropriate processor as needed.

An example of JIT optimizer server 300 can comprise few logical modules such as but not limited to: an MD-IP network-interface (MDIPNI) 310, a Manager module (MM) 320, an active flow table (AFT) 350, one or more MD queues, MDQ1 330*a* to MDQn 330*n*, and IP network interface (IPNI) 315. Each queue 330*a-n* can be stored in one or more non-transitory memory devices or all the queues can be stored in the same memory device.

An example of AFT 350 can be embedded in a memory device and can be arrange as a table in which each row can be associated with an active flow. In addition AFT 350 can comprise a plurality of columns. The first four columns can be allocated to the identifiers of a flow (IP addresses and ports), the following column can be associated with the type of content that is carried over that flow; the next column can be associated with the maximum and minimum value of periods that packets of flow can be postponed by the JIT optimizer server 300, another column can be associated with the value of the JIT indication that was attached to the last packet of that flow, which was sent toward the relevant MD 110 (FIG. 1), etc.

IP packets obtained from MD 110 (FIG. 1) via the AGW 134 can be parsed by MDIPNI 310. Based on the header of the packet, the MDIPNI 310 can define the flow to which the packet belongs. A flow can be identified by the destination IP address and port and by the source IP address and port or by any other session/flow detection methods. Then, the AFT 350 can be searched by MDIPNI 310 looking for an entry that is associated with that flow.

If an entry does not exist, which means that the flow is a new one, then an embodiment of the MDIPNI 310 can be configured to allocate an entry for the new flow in the AFT 350. Next, the relevant fields of that entry can be updated. Fields such as but not limited to source address and port number, destination address and port number, domain name, the packet receiving time, etc. Some embodiments of MDIPNI 310 can be configured to identify the type of content of the new flow based on the destination domain, or based on the protocol that is used, Other embodiments of the MDIPNI 310 may analyze the pattern of a flow or the network signature of the flow in order to determine the type of content that is carried over that flow of downloaded packets. For example, a flow of video streaming may comprise multiple transactions of medium objects. In such embodiment the type of content can be written by the MDIPNI 310 in the relevant cell of AFT 350.

Then, the packet or a pointer to the packet can be transferred toward a queue of the MM 320. In an alternate embodiment, if an entry, in AFT 350, does not exist, then the MDIPNI 310 may transfer the packet directly to the queue of the MM 320 for further processing. An example of MM 320 can be configured to manage content awareness scheduling by manipulating the download traffic. Other example embodiments of MM 320 can be configured to manage content awareness scheduling by manipulating the uplink traffic.

If an entry in the AFT 350 exists, then the entry can be parsed by MDIPNI 310 and be updated with information related to the received packet. Information such as but not limited to the receiving time, type of the packet; is it a handshake packet, a status packet, a data request packet or others. Next the packet can be transferred toward the relevant MD queue (MDQ1-MDQn) 330*a-n* and a pointer can be placed at the queue of MM 320 or the queue of IPNI 310.

In some embodiments, in which the MM 320 is configured to act as a JIT marking engine, the MM 320 may add a JIT indication to the header of the packet before storing it in the appropriate queue. In such embodiment the MDIPNI 310 can be configured to act as a JIT agent. Thus, among other functionality of a network interface module an example of MDIPNI 310 can be configured to scan the MDQs 330*a-n* and to obtain packets directed toward the MDs 110 based on their JIT indication. Next, the MDIPNI 310 can drop the packet or remove the JIT indication and send the packet toward the relevant MD 110 just in time when the application at the MD needs the content that is carried over that packet. Such an example embodiment of MDIPNI 310 can execute a process that is substantially similar to the task that is disclosed below in conjunction with FIG. 5.

IP packets obtained from IP servers 152*a-c* or 162*a-c* via the I-GW 138 (FIG. 1) can be parsed by IPNI 315. Based on the header of the packet, the IPNI 315 can identify the flow to which the packet belongs. Then, the AFT 350 can be searched looking for an entry that is associated with that flow. Based on the found entry the packet can be transferred toward the relevant queue MDQ 330*a-n* and a pointer can be placed at the queue of MM 320. In the other direction requests, obtained from the MDs 110 (FIG. 1), are transferred via MDIPNI 310, MM 320 and via IPNI 315 toward IP servers 152*a-c* or 162*a-c* via the Internet 140 (FIG. 1).

MM 320 can be implemented by one or more processors. Software that is needed for the operation of the one or more processors may be embodied on a computer readable non-transitory memory device such as but not limited to a read/write hard disc, CDROM, Flash memory, ROM, or other memory or storage devices, etc. In order to execute its tasks one or more software programs may be loaded to one or more processors of the MM 320.

In some embodiments of the present disclosure after loading its software MM 320 can be configured to identify period of congestion. Yet, in other embodiments MM 320 can be configured to execute the disclosed task independently of the current congestion. An example of MM 320 can be configured to identify a new session and the type of content that is carried over a flow of that session. Next, the DL packets can be delayed in the relevant MDQ1-MDQn 330*a-n*. Based on the type of content that is carried over the flow of packets. The delayed packets can be transmitted toward the relevant MD 110 JIT when the application that is running over the MD 110 needs them. Some examples of MM 320 can be configured to execute similar task of a JIT marking engine 224 (FIG. 2), which is disclosed below in conjunction with FIG. 4.

Other examples embodiments of MM 320 may manage the upload traffic, traffic of requests from the MDs toward the IP servers. An example of such MM 320 can be a processor that is configured to identify the type of content that is carried over a first flow of downloaded packets toward a first MD 110 (FIG. 1) from the plurality of associated MDs. Next, the MM 320 can determine when the content, which will be carried over a response to a current request that is sent from the MD 110 toward a relevant server will be needed by an application that handles the first flow of downloaded packets at the first MD and accordingly can delay the request for the next packet that was sent from the MD 110 toward the relevant server.

Some example embodiments of MM 320 can identify the type of content that is carried over a flow of downloaded packets toward MD 110 (FIG. 1) based on the domain 150 or 160 that delivers the relevant flow of packets. Usually packets that are downloaded from "YouTube" carry video data. Other embodiments of MM 320 may analyze the pattern of a flow in order to determine the type of content that is carried over that flow of downloaded packets. A flow of DL packets that comprise multiple transactions of medium objects can be identified, by an example MM 320, as video streaming. Yet some embodiments may identify the type of content based on the protocol that is used, etc.

Some example embodiments of MM 320 can be configured to handle encrypted downloaded packets that carry video data from content providers such as but not limited to YouTube LLC or Facebook Inc. Some of those example embodiments of MM 320 may determine that the encrypted downloaded packets carry video data based on the content server that delivers those packets. For example, if the encrypted packets are delivered from YouTube domain, then the encrypted content can be handled as encrypted video data.

Other embodiments of MM 320 may analyze the signature of the flow of data packets. A flow that comprises multiple transactions of medium size object can be marked as a flow that carries encrypted video data. Other example embodiments of MM 320 may determine that the encrypted flow of data comprise video data based on the protocol that is used for downloading the encrypted video data. Other example embodiments of MM 320 may combine the source of the data flow and the signature of the flow in order to determine that the flow carries encrypted video data. Yet other embodiments of MM 320 may use other methods for determining that the encrypted data packets carry video data.

Some example embodiments of MM 320 may use a read-ahead-buffer table (RABT) per each type video player in order to determine the play time of the content that is stored in a read-ahead buffer of the video player at the MD 110 (FIG. 1) that is related to the relevant flow. An example of an RABT may have three columns and a plurality of lines. The first column can be associated with the resolution in which the video is presented, each line indicates the presented resolution (1080, 720, 480 pixels, etc.). The second column can be associated with the volume of bytes that are stored in the read-ahead-buffer of the player and the $3^{rd}$ column can be associated with the play time of the stored data in the read-ahead-buffer. Examples of RABT exist over the Internet in association to the type of video player.

In order to use such a RABT an example embodiment of MM 320 can be configured to generate a plurality of predicting models. Each predicting model can be configured to predict the resolution that is currently used by the video player. The predicted resolution can be placed in the RABT in order to estimate the play time of the video data that is stored in the read-ahead buffer of the MD.

Per each type of video player and per each possible resolution a predicting model can be generated by MM 320. Using the current RTT (round trip time), the current download bitrate, and the elapsed time as the values of the variables to be placed in the predicting model of each possible resolution of a certain video player. Then, the probability that the relevant resolution is used can be calculated by MM 320. The process can be repeated and be executed per each possible resolution. Then the values of the probabilities of each possible resolution can be compared by MM 320 and the resolution that is associated with the highest value of probability can be pointed as the current used resolution. This resolution can be placed in the RABT in order to retrieve the play time of the video data that is stored in the read-ahead buffer of the player in the MD.

Next, an embodiment of MM 320 may hold the downloaded process for a portion of the play time of the read-ahead buffer. The downloading process can be resumed upon determining that play time is going to be terminated. Thus, the downloading process can be resumed just in time before terminating the play time. The JIT can be few seconds before terminating the read-head buffer. In some embodiments of MM 320 the JIT period can be in the range between two to 60 seconds, 40 seconds before terminating the play time of the read-ahead buffer of the relevant video player, for example.

In order to create a set of predicting models per each video player plurality of trials can be executed. In each trial different values of RTT, bitrate, elapsed time, etc. are used and the resolution that is used by the player is recorded. At the end of those trials a database was generated with a plurality of entries per each video player. Then, an example of MM 320 can be configured to execute machine learning algorithm that analyzes the stored data of the trials and deliver an appropriate predicting model to predict the probability that the associated resolution is used by the player. The machine learning algorithm can be based on algorithm such as but not limited to logistic regression, linear regression, decision tree, random-forest, etc.

Figure 4:
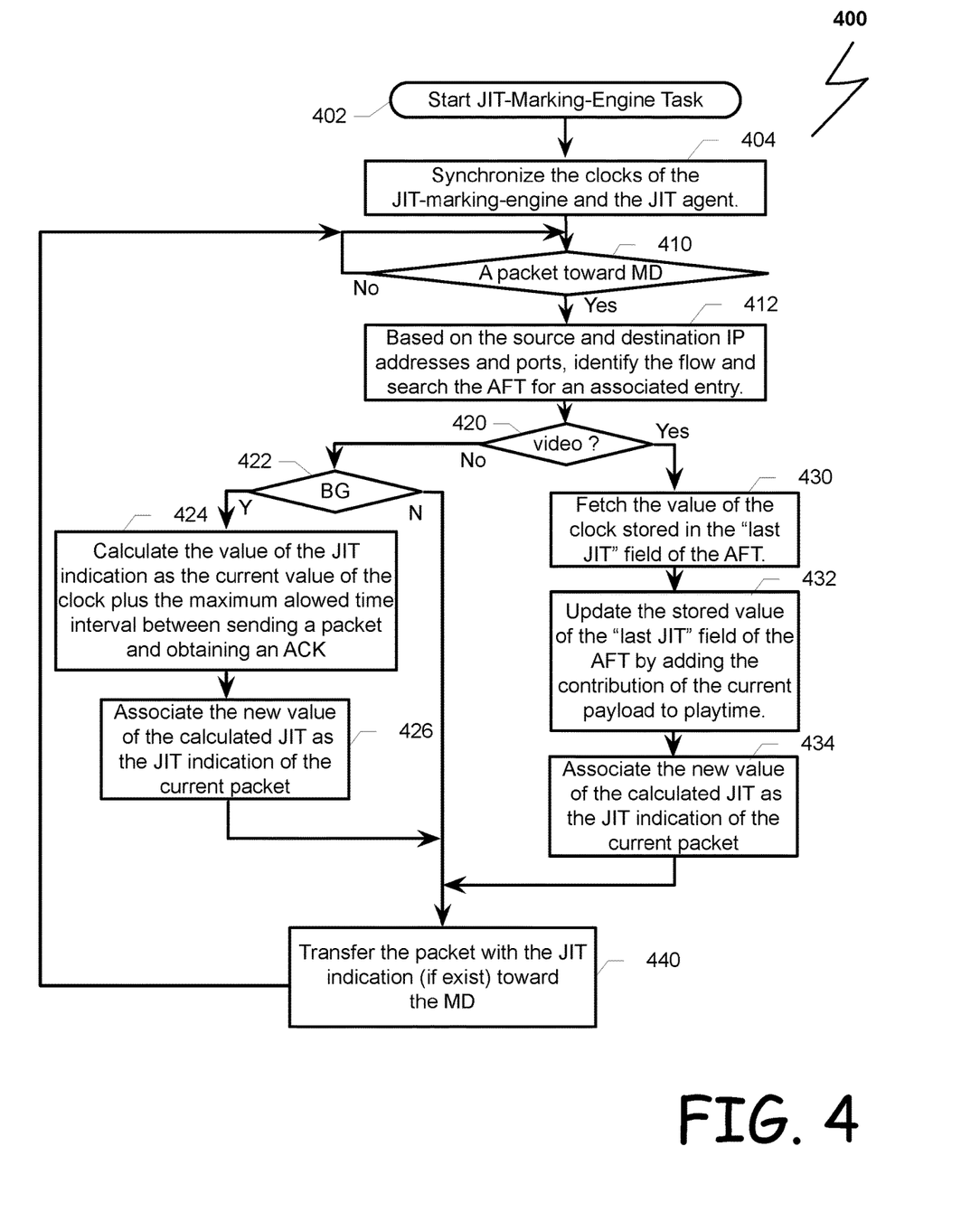
FIG. 4 illustrates a flowchart with relevant actions of an example process of JIT marking engine that may be used for marking a downloaded packet with JIT indication.

FIG. 4 illustrates a flowchart with relevant actions of a process that can be implemented by an example of JIT marking engine 224 (FIG. 2B) for marking a downloaded packet with a JIT indication. Method 400 can be initiated 402 when JIT marking engine 224 is initiated. Upon initiation 402, process 400 may synchronize 404 its clock with a clock of JIT agent 227 (FIG. 2B). In embodiments of the disclosed technique in which JIT optimizer server 234 (FIG. 2C) or JIT optimizer server 300 (FIG. 3) is used the clock of MM 320 can be synchronized with the clock of MDIPNI 310. Further, in such embodiment, among other tasks MM 320 can act as a JIT marking engine and execute a process that is similar to process 400 with few modifications. Modification such as the one that is disclosed above in conjunction with block 404.

Next, process 400 may check 410 its queue looking for a packet or a pointer to a packet that is directed toward an MD 110 (FIG. 1). If 410 a packet do not exist, then process 400 may wait 410 for a packet. If 410 a packet exists, then at block 412 the header of the packet is parsed. Based on the destination IP address and port and the source IP address and port the AFT can be searched 412 looking for an entry that is associated with the relevant flow. The found entry can be parsed. Based on the type of content that is written in the appropriate cell of that entry of AFT 350 a decision can be made 420 whether the payload of the current packet is video.

If 420 the content is video, then at block 430 the last "JIT field" of the relevant entry of AFT 350 can be fetched 430 and be updated 432 by adding the contribution of the current payload to the play time of the video. The updated value of the JIT indication can be written in the JIT field of the relevant entry of AFT 350. In addition the value of the updated JIT can be associated 434 to the current packet. Associating 434 the value of the updated JIT to the packet can be done by using Differentiated Services Code Point (DSCP) in the Different-Services field (DS field) of the IP header of the current packet. Other example embodiment of JIT marking engine task 400 can use the Network Service Header (NSH) for associating 434 the JIT indication to the packet.

Next, the packet with the updated JIT indication (if exist) can be transferred 440 toward the relevant MD 228a-n via a JIT agent 227 (FIG. 2B) and process 400 may return to block 410 for handling the next packet.

Return now to block 420, if the content is not video, then at block 422 a decision is made whether the packet can be sent in the background. If not, then process 400 proceeds to block 440 and transfer the packet toward the relevant MD 110. In such a case there is no need to add the JIT indication. Then, process 400 returns to block 410 for handling the following packet.

If 422 the packet can be sent in the background, then at block 424 the value of the JIT indication can be calculated as the current value of the clock plus the value of the time interval that is allowed to be between sending a packet and getting a respond to that packet. The calculated JIT value can be associated 426 as a JIT indication to the header of the packet. Next the packet with the JIT indication can be transferred 440 toward the MD 228a-n via a JIT agent 227 (FIG. 2B).

A person with ordinary skill in the art will appreciate that in embodiments of the disclosed technique in which JIT optimizer server 300 (FIG. 3) is used, then few blocks of process 400 can be modified in order to be executed by MM 320 (FIG. 3). For example, at block 404 the clock of MM 320 can be synchronized with the clock of MDIPNI 315 (FIG. 3).

Figure 5:
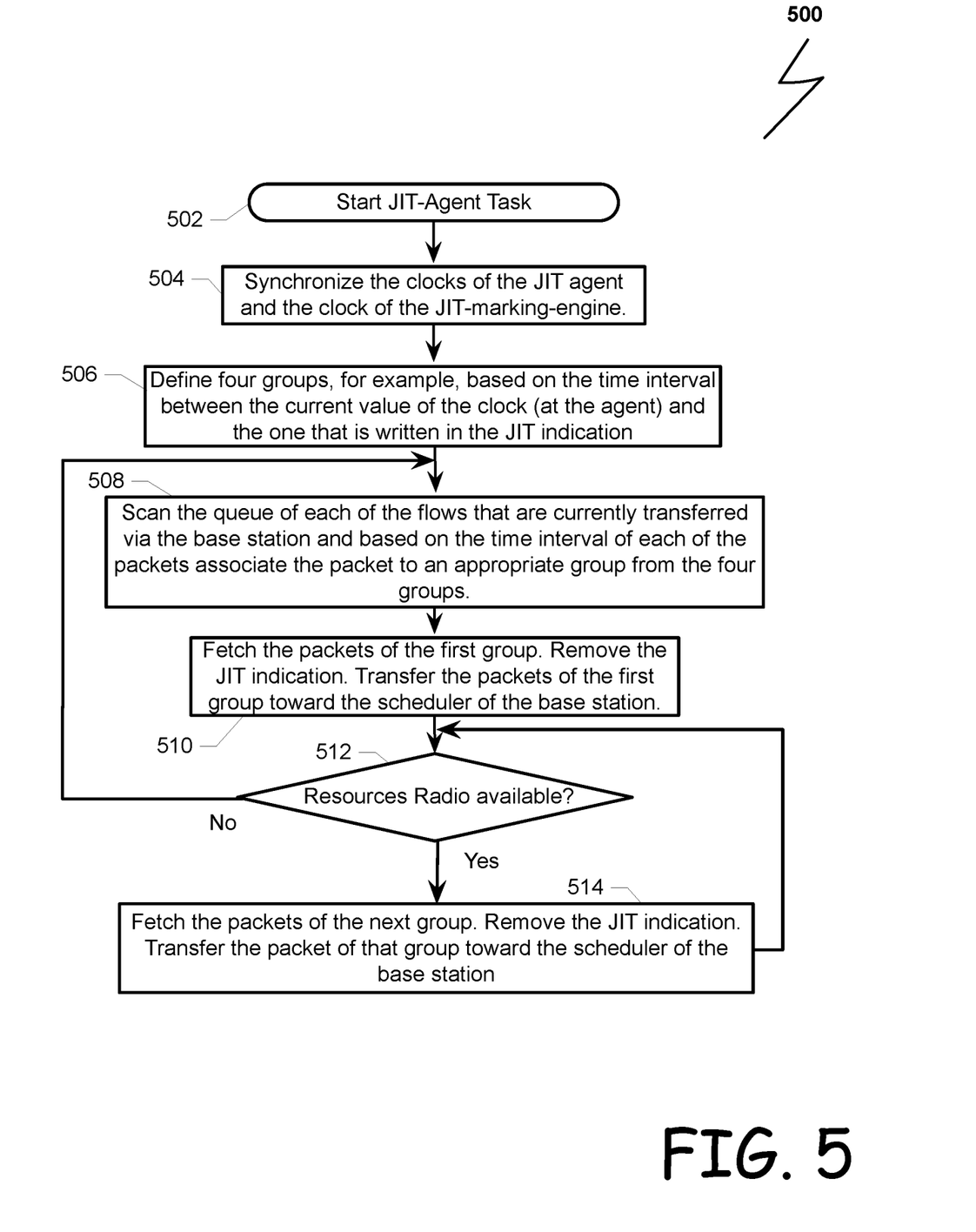
FIG. 5 illustrates a flowchart with relevant actions of a process that can be handled by an example of JIT agent for handling packets based on the JIT indication.

Referring now to FIG. 5 that illustrates an example process 500 that can be implemented by an example of JIT agent 227 (FIG. 2). A person having ordinary skill in the art will appreciate that in embodiments in which JIT optimizer server 300 (FIG. 3) or JIT engine 216 (FIG. 2) are used, then few blocks of process 500 can be modified in order to be executed by MDIPNI 310 (FIG. 3). For example, block 504 the clock of MDIPNI 315 can be synchronized with the clock of MM 320 (FIG. 3) instead of the clock of JIT agent.

Method 500 can be initiated 502 when JIT-agent 227 (FIG. 2B) is initiated. Upon initiation 502, process 500 may synchronize 504 its clock with a clock of JIT marking engine 224 (FIG. 2B). In embodiments of the disclosed technique in which JIT optimizer server 234 (FIG. 2C) or JIT optimizer server 300 (FIG. 3) is used the clock of MDIPNI 310 can be synchronized with the clock of MM 320.

At block 506 an example of process 500 can define few groups of packets based on the time interval between the JIT indication, which is associated with the relevant packet and the current value of the clock of the JIT agent 227 (FIG. 2B). The number of groups can be in the range of two to six groups, for example. In an example of process 500 in which four groups are used, the first group can comprise packets in which the time interval is smaller than five seconds. The second group can comprise packets in which the time interval is in between five to ten seconds, for example. The third group can comprise packets in which the time interval is in between ten to fifteen seconds, for example. The fourth group can comprise packets in which the time interval is above fifteen seconds, for example.

At block 508 an example of JIT agent can scan the queue of each of the flows of packets that are currently transferred via the relevant BS and based on the time interval between the clock of the JIT agent, at the BS, and the JIT indication that is associated with each packet the packet can be associated with the appropriate group of packets.

Next, the packets of the first group can be fetched 510, the JIT indication of each packet can be removed and the packet can be transferred 510 toward the relevant MD 228a-n (FIG. 2B) via the scheduler of the BS, eNodeB 226, for example. After transferring the packets of the first group a decision can be made 512 whether the BS (such as but not limited to eNodeB 226) has free radio resources. If 512 eNodeB 226 does not have free radio resources, then process 500 may return to block 508 for organizing new set of groups.

If 512 the BS (eNodeB 226) has free radio resources, then process 500 may fetch 514 the packets of the next group. The JIT indication of each packet of the next group can be removed 514 and the packet can be transferred 514 toward the relevant MD 228a-n (FIG. 2B) via the scheduler of the BS eNodeB 226, for example. After transferring the packets 514 of the current group process 500 can return to block 512 and check whether the BS (eNodeB 226) has free radio resources.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

The above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein".

What is claimed is:

1. A non-transitory computer readable memory device comprising executable instructions that when executed cause a processor, at a just-in-time (JIT) optimizer server:
    i. to identify the type of content that is carried over a first flow of downloaded packets in the direction toward a first mobile device (MD) from a plurality of MDs that are associated with the JIT optimizer server;
    ii. to determine when the content, which is carried over a certain one or more packets of the first flow, will be needed by a video player at the first MD that handles the first flow of downloaded packets, wherein the determination is based on data that is currently stored in a read-ahead buffer at the first MD and predicting the resolution that is used by the video player by placing the values of the current RTT, the bitrate and the elapsed time in a predicting model that is associated with the video player and one or more possible resolutions;
    iii. to manage the delivery of the certain one or more packets in the direction toward the first MD just-in-time (JIT) prior to the time in which the application, at the first MD, needs to handle the content that is carried over the certain one or more packets; and
    wherein the JIT optimizer server is communicatively coupled between the plurality of MDs and a plurality of content servers.

2. A non-transitory computer readable memory device comprising executable instructions that when executed cause a processor, at a just-in-time (JIT) optimizer server:
    i. to identify the type of content that is carried over a first flow of downloaded packets in the direction toward a first mobile device (MD) from a plurality of MDs that are associated with the JIT optimizer server;
    ii. to determine when the content, which is carried over a certain one or more packets of the first flow, will be needed by a video at the first MD that handles the first flow of downloaded packets, based on the data that is currently stored in a read-ahead buffer at the first MD and further comprising identifying that the certain one or more packets carry video data that is associated with a seek request that was sent from the first MD;
    iii. to manage the delivery of the certain one or more packets in the direction toward the first MD just-in-time (JIT) prior to the time in which the application, at the first MD, needs to handle the content that is carried over the certain one or more packets; and
    wherein the JIT optimizer server is communicatively coupled between the plurality of MDs and a plurality of content servers.

3. The non-transitory computer readable memory device of claim 2, wherein identifying that the certain one or more packets carry video data that is associated with a seek request is implemented by identifying a change in the download pattern.

4. A non-transitory computer readable memory device comprising executable instructions that when executed cause a processor, at a just-in-time (JIT) optimizer server:
    i. to identify the type of content that is carried over a first flow of downloaded packets in the direction toward a first mobile device (MD) from a plurality of MDs that are associated with the JIT optimizer server;
    ii. to determine when the content, which is carried over a certain one or more packets of the first flow, will be needed by an application, at the first MD, that handles the first flow of downloaded packets;
    iii. to manage the delivery of the certain one or more packets in the direction toward the first MD just-in-time (JIT) prior to the time in which the application, at the first MD, needs to handle the content that is carried over the certain one or more packets by transmitting one or more requests for the certain one or more packets in the direction toward the content server, which delivers the first flow of downloaded packets;
    iv. to monitor a retransmission pattern of requests and upon determining that a current request does not match the retransmission pattern, the current request is transmitted toward the content server without further delay; and
    wherein the JIT optimizer server is communicatively coupled between the plurality of MDs and a plurality of content servers.

5. A system comprising:
a. a just-in-time (JIT) engine that is communicatively coupled between a plurality of mobile devices (MDs) and a plurality of internet servers;
b. wherein the JIT engine is configured:
   i. to identify the type of content that is carried over a first flow of downloaded packets in the direction toward a first MD from the plurality of MDs that are associated with the JIT engine;
   ii. to determine when the content, which is carried over a certain one or more packets of the first flow, will be needed by video player at the first MD that handles the first flow of downloaded packets, based on the data that is currently stored in a read-ahead buffer at the first MD and based on predicting the resolution that is used by the video player, wherein predicting the resolution that is used by the video player is calculated by placing the values of the current RTT, the bitrate and the elapsed time in a predicting model that is associated with the video player and one or more possible resolutions;
   iii. to manage the delivery of the certain one or more packets in the direction toward the first MD just-in-time (JIT) prior to the time in which the application, at the first MD, needs to handle the content that is carried over the certain one or more packets.

6. A system comprising:
a. a just-in-time (JIT) engine that is communicatively coupled between a plurality of mobile devices (MDs) and a plurality of internet servers;
b. wherein the JIT engine is configured:
   i. to identify the type of content that is carried over a first flow of downloaded packets in the direction toward a first MD from the plurality of MDs that are associated with the JIT engine;
   ii. to determine when the content, which is carried over a certain one or more packets of the first flow, will be needed by an application, at the first MD, that handles the first flow of downloaded packets and when the content carries video data that is associated with a seek request that was sent from the first MD;
   iii. to manage the delivery of the certain one or more packets in the direction toward the first MD just-in-time (JIT) prior to the time in which the application, at the first MD, needs to handle the content that is carried over the certain one or more packets; and
   iv. carry video data that is associated with a seek request that was sent from the first MD.

7. The system of claim 6, wherein the JIT engine is further configured to determine when the content that is carried over the certain one or more packets carry video data that is associated with a seek request is implemented by identifying a change in the download pattern.

8. A system comprising:
a. a just-in-time (JIT) engine that is communicatively coupled between a plurality of mobile devices (MDs) and a plurality of internet servers;
b. wherein the JIT engine is configured:
   i. to identify the type of content that is carried over a first flow of downloaded packets in the direction toward a first MD from the plurality of MDs that are associated with the JIT engine;
   ii. to determine when the content, which is carried over a certain one or more packets of the first flow, will be needed by an application, at the first MD, that handles the first flow of downloaded packets;
   iii. to manage the delivery of the certain one or more packets in the direction toward the first MD by transmitting one or more requests, for the certain one or more packets, in the direction toward the content server that delivers the first flow of downloaded just-in-time (JIT) prior to the time in which the application, at the first MD, needs to handle the content that is carried over the certain one or more packets; and,
   iv. to monitor a retransmission pattern of requests and upon determining that a current request does not match the retransmission pattern, the current request is transmitted toward the content server without further delay.

9. A non-transitory computer readable memory device comprising executable instructions that when executed cause a processor, at a just-in-time (JIT) engine:
a. to identify the type of content that is carried over a first flow of downloaded packets in the direction toward a first mobile device (MD) from a plurality of MDs that are associated with the JIT engine;
b. to determine when the content, which will be carried over a response to a request that is sent from the first MD toward a relevant content server will be needed by an application that handles the first flow of downloaded packets at the first MD;
c. to deliver the request in the direction of the relevant server just-in-time (JIT) when the content that will be carried by the responded packet is needed to be processed by the application, at the first MD, that handles the first flow of downloaded packets; and
d. wherein the JIT engine is communicatively coupled between the plurality of MDs and a plurality of content servers.

* * * * *